(12) United States Patent
Lee

(10) Patent No.: US 8,049,442 B2
(45) Date of Patent: Nov. 1, 2011

(54) ELECTRIC INJECTION MOLDING MACHINE

(75) Inventor: Wei-Jen Lee, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 478 days.

(21) Appl. No.: 12/324,880

(22) Filed: Nov. 27, 2008

(65) Prior Publication Data

US 2010/0102770 A1  Apr. 29, 2010

(30) Foreign Application Priority Data

Oct. 23, 2008  (CN) .......................... 2008 1 0305119

(51) Int. Cl.
*H02P 1/00* (2006.01)

(52) U.S. Cl. .......................... 318/139; 318/375; 318/376
(58) Field of Classification Search .................. 318/139, 318/798, 800, 801, 376, 375
See application file for complete search history.

(56) References Cited

U.S. PATENT DOCUMENTS

| | | | | |
|---|---|---|---|---|
| 4,988,273 A * | 1/1991 | Faig et al. | ...................... | 425/145 |
| 5,469,031 A * | 11/1995 | Chorey | .......................... | 318/375 |
| 5,582,756 A * | 12/1996 | Koyama | .......................... | 219/497 |
| 6,333,611 B1 * | 12/2001 | Shibuya et al. | ................ | 318/370 |
| 6,752,614 B2 * | 6/2004 | Mizuno | .......................... | 425/145 |
| 7,176,648 B2 * | 2/2007 | Choi | .............................. | 318/625 |

* cited by examiner

*Primary Examiner* — Rina Duda
(74) *Attorney, Agent, or Firm* — Altis Law Group, Inc.

(57) ABSTRACT

An electric injection molding machine includes a motor driving circuit for driving a motor, and a delivery pipe. The motor driving circuit includes a rectifier circuit, a switch control circuit, a heater, a direct current (DC) link circuit, and an inverter circuit. The switch control circuit is configured for controlling the motor to output a regenerative current generated in a deceleration period of the motor. The heater is configured for receiving the regenerative current to heat the delivery pipe via the switch control circuit. A micro control unit (MCU) outputs a heat control signal according to the voltage from the DC link circuit to turn on the switch control circuit so as control deceleration of the motor such that a regenerative current from the motor is supplied to the heater to heat the delivery pipe.

17 Claims, 3 Drawing Sheets

ELECTRIC INJECTION MOLDING MACHINE

BACKGROUND

1. Technical Field

The present disclosure relates to molding machines, and particularly to an electric injection molding machine.

2. Description of Related Art

Injection molding machines (also known as injection presses) are machines for manufacturing plastic products by an injection molding process. Motors are generally used to make moveable elements of the injection molding machine work. A motor driving circuit is used to drive the motor. In a motor driving process, a large drive current is caused to flow during acceleration (power ruining) period, and a regenerative current is generated in a deceleration period of the motor. However, the regenerative current generated in the deceleration period is thermally consumed by resistance, resulting in wasted energy loss.

What is needed is to provide an electric injection molding machine to overcome the above-described shortcomings.

DETAILED DESCRIPTION

Figure 1:
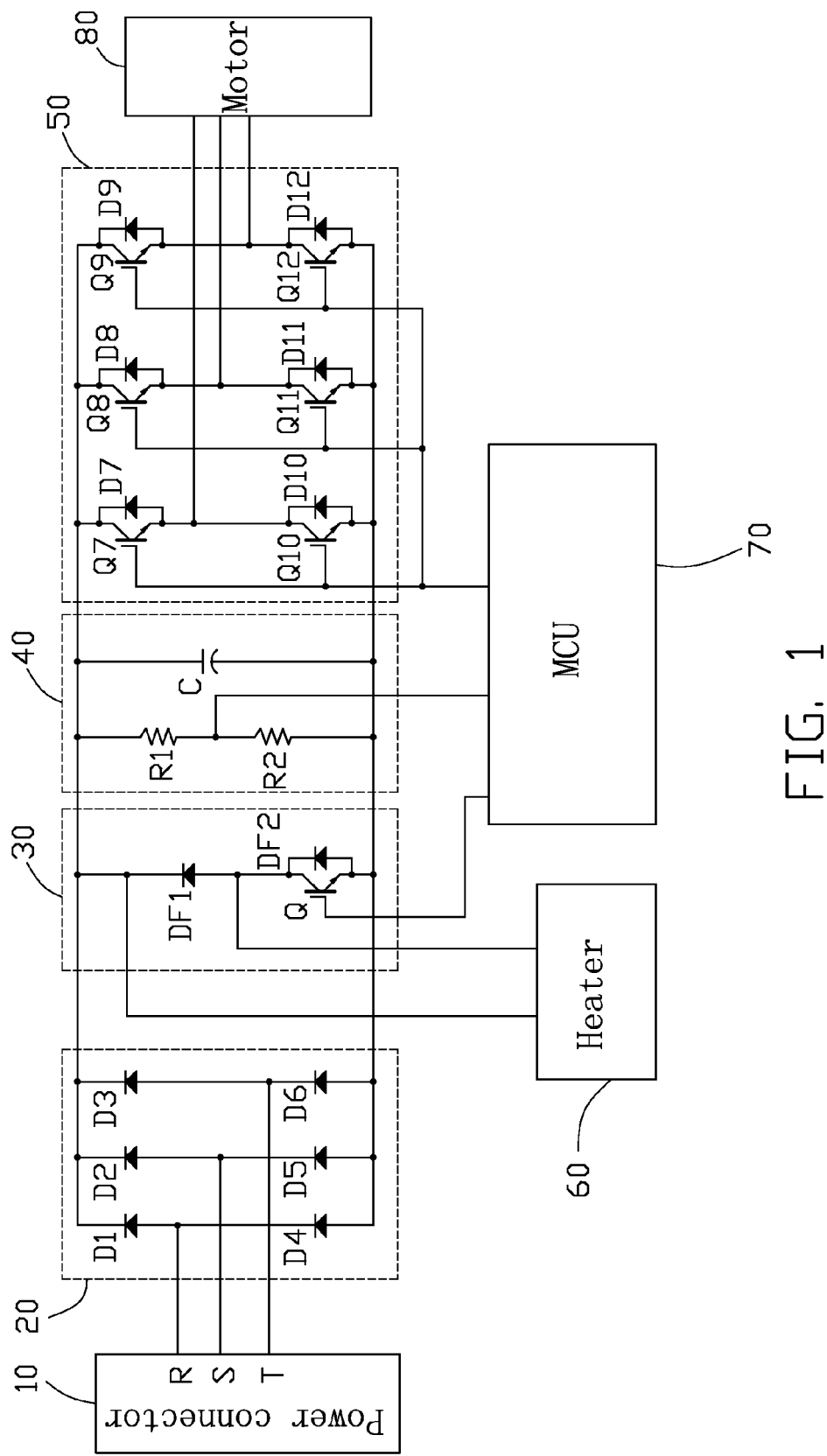
FIG. 1 is a partial circuit diagram of an exemplary embodiment of an electric injection molding machine.

Referring to FIG. 1, an exemplary embodiment of a motor driving circuit of an electric injection molding machine includes a power connector 10, a rectifier circuit 20, a switch control circuit 30, a direct current (DC) link circuit 40, an inverter circuit 50, a heater 60, and a micro control unit (MCU) 70. The power connector 10 includes a first terminal R, a second terminal S, and a third terminal T, and is configured for connecting to a three-phase alternating current (AC) power source (not shown). The inverter circuit 50 is configured to drive a motor 80. The first terminal R, the second terminal S, and the third terminal T are separated by a voltage phase difference of 120 degrees.

The rectifier circuit 20 is configured for receiving the three-phase AC power via the power connector 10 and converting the three-phase AC power to DC power. The rectifier circuit 20 includes six diodes D1-D6. The first terminal R of the power connector 10 is connected to the anode of the diode D1 and the cathode of the diode D4. The second terminal S of the power connector 10 is connected to the anode of the diode D2 and the cathode of the diode D5. The third terminal T of the power connector 10 is connected to the anode of the diode D3 and the cathode of the diode D6. The cathodes of the diodes D1-D3 and the anodes of the diodes D4-D6 are connected to the switch control circuit 30.

Figure 2:
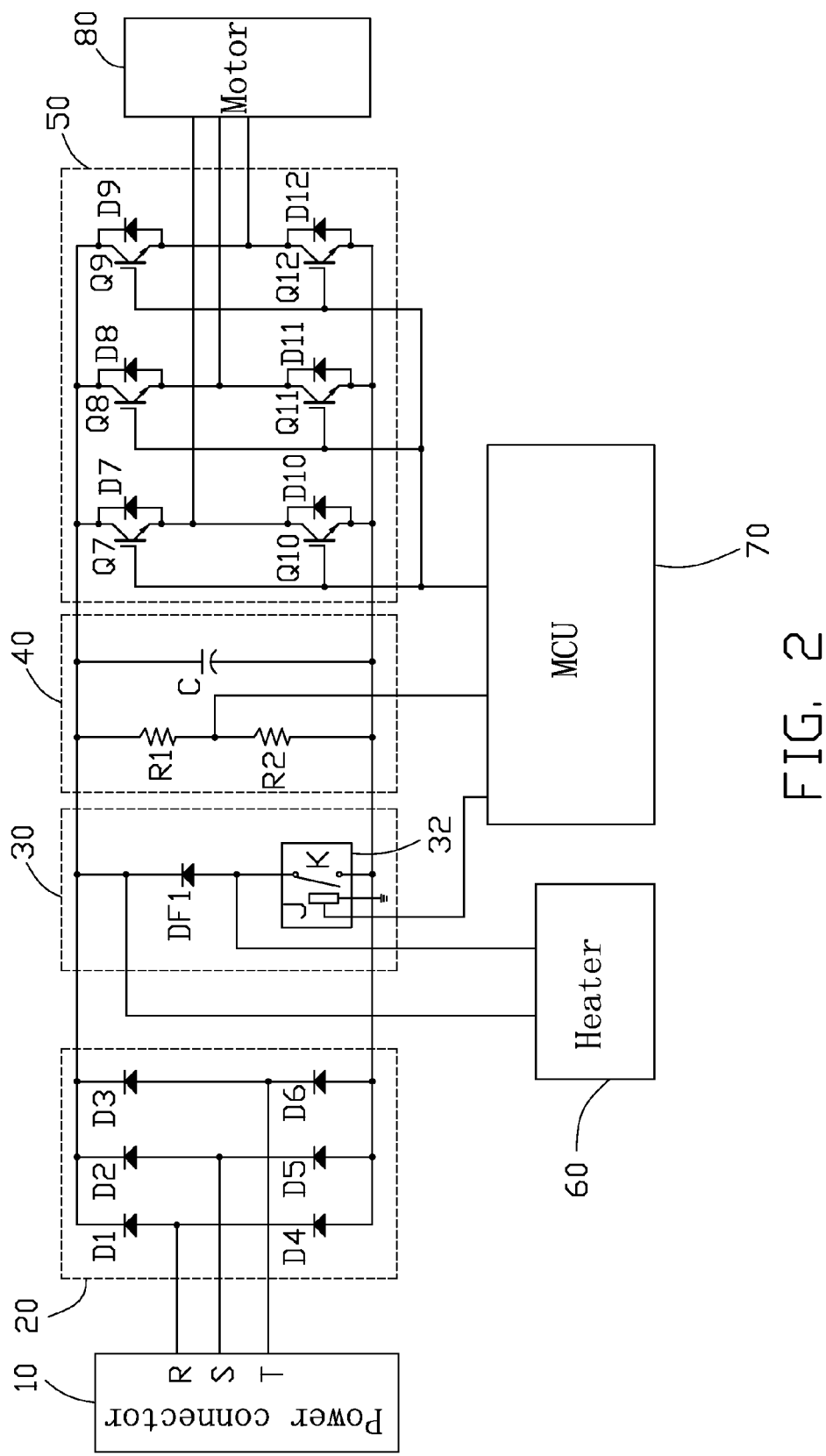
FIG. 2 is a partial circuit diagram of another exemplary embodiment of an electric injection molding machine.

The switch control circuit 30 is configured for controlling the motor 80 to output a regenerative current generated during a deceleration period of the motor 80. The switch control circuit 30 includes an electrical switch, such as a transistor Q, and two diodes DF1, DF2. The cathode of the diode DF1 is connected to the cathodes of the diodes D1-D3. The anode of the diode DF1 is connected to a collector (first terminal) of the transistor Q. A base (control terminal) of the transistor Q is connected to the MCU 70. An emitter (second terminal) of the transistor Q is connected to the anodes of the diodes D4-D6. The diode DF2 is connected between the collector and the emitter of the transistor Q. In one embodiment, the diode DF1 is a freewheeling diode. In another embodiment (See FIG. 2), the transistor Q can be replaced by a relay 32 including a switch K and a coil J. When the switch control circuit 30 uses the relay 32, a first terminal of the switch K of the relay 32 is connected to the anode of the diode DF1, a second terminal of the switch K of the relay 32 is connected to the anodes of the diodes D4-D6, a first terminal (as the control terminal of the electrical switch) of the coil J of the relay 32 is connected to the MCU 70, a second terminal of the coil J is grounded.

The DC link circuit 40 is configured for receiving the DC power from the rectifier circuit 20 and transmitting the DC power to the inverter circuit 50. The DC link circuit 40 includes a capacitor C and two voltage-dividing resistors R1 and R2. A first terminal of the capacitor C is connected to the cathode of the diode DF1. A second terminal of the capacitor C is connected to the emitter of the transistor Q. The resistors R1 and R2 are connected in series with each other, and then connected in parallel with the capacitor C. A node between the two resistors R1 and R2 is connected to the MCU 70 to transmit a DC voltage to the MCU 70. It may be understood that the two resistors R1 and R2 serve as a voltage divider.

The inverter circuit 50 is configured for receiving the DC power from the DC link circuit 40 and converting the DC power to a three-phase AC power to drive the motor 80. The inverter circuit 50 includes six transistors Q7-Q12 and six diodes D7-D12. Collectors of the transistors Q7-Q9 are connected to the first terminal of the capacitor C. Emitters of the transistors Q10-Q12 are connected to the second terminal of the capacitor C. Bases of the transistors Q7-Q12 are connected to the MCU 70. An emitter of the transistor Q7 and a collector of the transistor Q10 are connected to a first terminal of the motor 80. An emitter of the transistor Q8 and a collector of the transistor Q11 are connected to a second terminal of the motor 80. An emitter of the transistor Q9 and a collector of the transistor Q12 are connected to a third terminal of the motor 80. Each of the diodes D7-D12 is connected in parallel to one of the transistors Q7-Q12 correspondingly. The transistors Q7-Q12 are controlled to be turned on and off by the MCU 70 for supplying power to the motor 80.

The heater 60 is configured for receiving the regenerative current generated in the deceleration period of the motor 80. A first terminal of the heater 60 is connected to the cathode of the diode DF1. A second terminal of the heater 60 is connected to the anode of the diode DF1.

Figure 3:
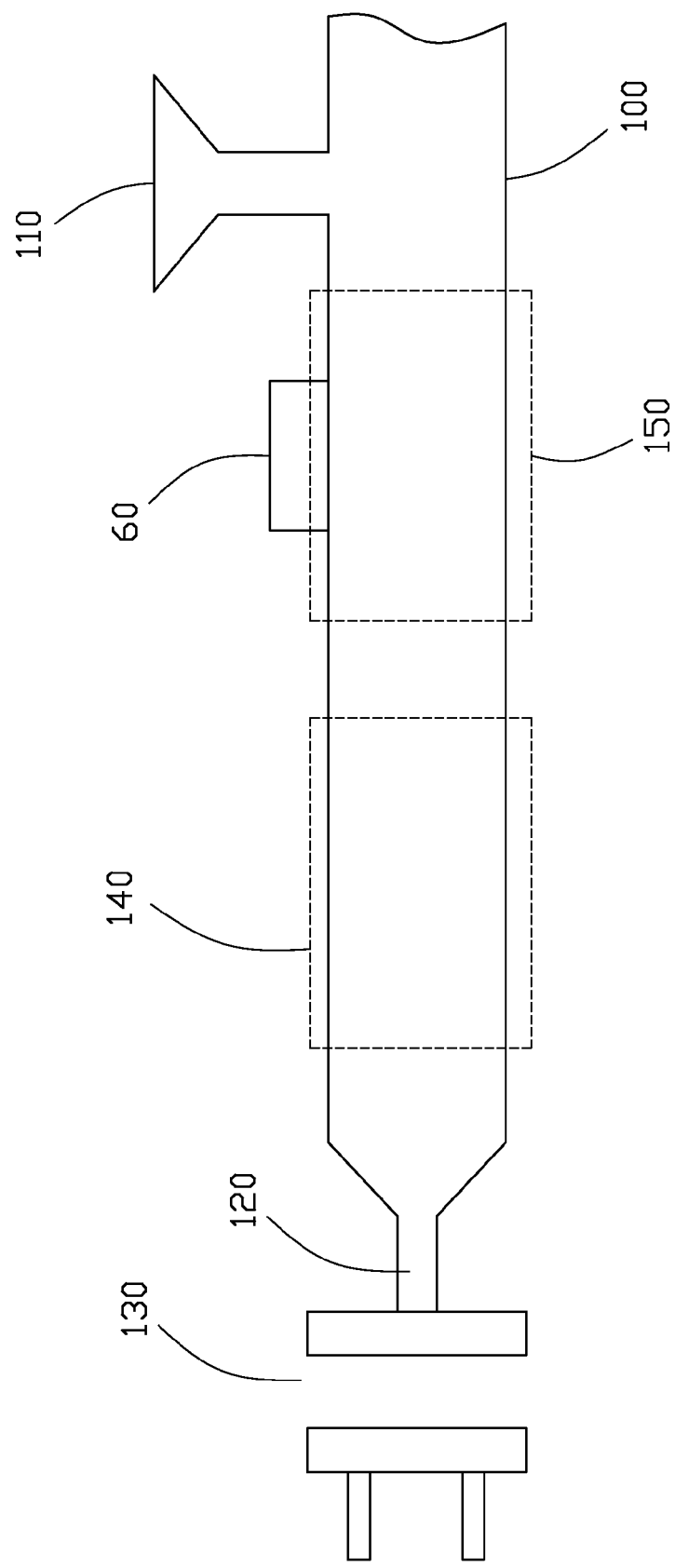
FIG. 3 is a partial schematic view of an exemplary embodiment of an electric injection molding machine.

Referring to FIG. 3, a material injection part of the electric injection molding machine may include a delivery pipe 100, an inlet orifice 110, and an injection nozzle 120. In an injection process, material (such as molten plastic) is delivered to the delivery pipe 100 via the inlet orifice 110, and then is injected into a mold device 130 via the injection nozzle 120. An indicated area 140 of FIG. 3 includes a first temperature control unit, which is configured to heat the injection material as needed before being injecting the injection material into the mold device 130. It may be understood by an person of ordinary skill of the art that the first temperature control unit may use any known temperature control units used in an injection molding machine, and therefore, a detailed explanation is omitted. An indicated area 150 of FIG. 3 includes a second temperature control unit including the heater 60, which is mounted on the delivery pipe 100 and configured to further heat the injection material as need for increasing efficiency of the process.

In use, the first rectifier circuit 20 receives the three-phase AC power via the power connector 10 and converts the three-phase AC power to a DC power. The DC link circuit 40 transmits the DC power to the inverter circuit 50. The MCU 70 controls the transistors Q7-Q12 of the inverter circuit 50 to be turned on and/or turned off so as to drive the motor 80, in accordance with a command supplied from a controller such as a numerical controller (not shown) for controlling the motor driving circuit.

When the motor 80 is controlled by the MCU 70 at a deceleration state, a regenerative current is generated via the deceleration of the motor 80. At this time, the voltage at the nodes between the two resistors R1 and R2 of the DC link circuit 40 is increased. A heat control signal is outputted by the MCU 70, according to the increased voltage at the node between the two resistors R1 and R2 of the DC link circuit 40, to turn on the transistor Q (or the switch K of the relay 32). Thus, the regenerative current is supplied to the heater 60, and then the heater 60 works to heat the delivery pipe 100. Therefore, the regenerative current is effectively recycled to heat the delivery pipe 100, which can save energy and increase the heating efficiency.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A motor driving circuit for driving a motor, comprising:
   a rectifier circuit configured for receiving a first three-phase alternating current (AC) power and for converting the first three-phase AC power to a direct current (DC) power;
   a switch control circuit configured for controlling the motor to output a regenerative current in a deceleration period of the motor;
   a heater configured for receiving the regenerative current to heat an external device via the switch circuit;
   a micro control unit (MCU);
   a DC link circuit configured for receiving the DC power from the rectifier circuit, wherein the DC link circuit is configured to be connected to the MCU for supplying voltage to the MCU; and
   an inverter circuit configured for receiving the DC power from the DC link circuit and for converting the DC power to a second three-phase AC power to drive the motor;
   wherein the switch control circuit includes an electrical switch and a first diode, the cathode of the first diode is connected to the rectifier circuit, the anode of the first diode is connected to a first terminal of the electrical switch, a control terminal of the electrical switch is connected to the MCU, and a second terminal of the electrical switch is connected to the rectifier circuit; and
   wherein the MCU outputs a heat control signal according to the voltage from the DC link circuit to turn on the switch control circuit, so as control deceleration of the motor such that a regenerative current from the motor is supplied to the heater to operate.

2. The motor driving circuit of claim 1, further comprising a power connector having first-third terminals configured for connecting to the first three-phase AC power, wherein the rectifier circuit comprises first-sixth diodes, the first terminal of the power connector is connected to the anode of the first diode and the cathode of the fourth diode, the second terminal of the power connector is connected to the anode of the second diode and the cathode of the fifth diode, the third terminal of the power connector is connected to the anode of the third diode and the cathode of the sixth diode, the cathodes of the first-third diodes and the anodes of the fourth-sixth diodes are connected to the switch control circuit, wherein the first terminal, the second terminal, and the third terminal are separated by a voltage phase difference of 120 degrees.

3. The motor driving circuit of claim 1, wherein the first diode is a freewheeling diode.

4. The motor driving circuit of claim 1, wherein the electrical switch is a transistor including a collector, an emitter, and a base respectively corresponding to the first, second, and control terminals of the electrical switch.

5. The motor driving circuit of claim 4, wherein the switch control circuit further includes a second diode connected between the collector and emitter of the transistor.

6. The motor driving circuit of claim 1, wherein the electrical switch is a relay comprising a switch and a coil, first and second terminals of the switch of the relay are respectively corresponding to the first and second terminals of the electrical switch, and a first terminal of the coil is corresponding to the control terminal of the electrical switch, a second terminal of the coil is grounded.

7. The motor driving circuit of claim 1, wherein the DC link circuit includes two resistors connected in series and connected in parallel to the switch control circuit, a node between the two resistors is connected to the MCU to transmit a DC voltage at the node to the MCU.

8. The motor driving circuit of claim 7, wherein the DC link circuit further includes a capacitor connected in parallel to the two resistors.

9. An electric injection molding machine comprising:
   a delivery pipe for delivering injection material;
   a motor;
   a motor driving circuit for driving the motor, the motor driving circuit comprising:
   a rectifier circuit configured for receiving a first three-phase alternating current (AC) power and for converting the first three-phase AC power to a direct current (DC) power;
   a switch control circuit configured for controlling the motor to output a regenerative current in a deceleration period of the motor;
   a heater configured for receiving the regenerative current to heat the delivery pipe via the switch circuit;
   a micro control unit (MCU);
   a DC link circuit configured for receiving the DC power from the rectifier circuit, wherein the DC link circuit is configured to be connected to the MCU for supplying voltage to the MCU; and
   an inverter circuit configured for receiving the DC power from the DC link circuit and for converting the DC power to a second three-phase AC power to drive the motor;
   wherein the switch control circuit includes an electrical switch and a first diode, the cathode of the first diode is connected to the rectifier circuit, the anode of the first diode is connected to a first terminal of the electrical switch, a control terminal of the electrical switch is connected to the MCU, a second terminal of the electrical switch is connected to the rectifier circuit and
   wherein the MCU outputs a heat control signal according to the voltage from the DC link circuit to turn on the switch control circuit, so as to control deceleration of the motor such that a regenerative current from the motor is supplied to the heater to heat the delivery pipe.

10. The electric injection molding machine of claim 9, further comprising a power connector having first-third terminals configured for connecting to the first three-phase AC power, wherein the rectifier circuit comprises first-sixth diodes, the first terminal of the power connector is connected to the anode of the first diode and the cathode of the fourth diode, the second terminal of the power connector is connected to the anode of the second diode and the cathode of the fifth diode, the third terminal of the power connector is connected to the anode of the third diode and the cathode of the sixth diode, the cathodes of the first-third diodes and the anodes of the fourth-sixth diodes are connected to the switch control circuit, wherein the first terminal, the second terminal, and the third terminal are separated by a voltage phase difference of 120 degrees.

11. The electric injection molding machine of claim 9, wherein the first diode is a freewheeling diode.

12. The electric injection molding machine of claim 9, wherein the electrical switch is a transistor including a collector, an emitter, and a base respectively corresponding to the first, second, and control terminals of the electrical switch.

13. The electric injection molding machine of claim 12, wherein the switch control circuit further includes a second diode connected between the collector and emitter of the transistor.

14. The electric injection molding machine of claim 9, wherein the electrical switch is a relay comprising a switch and a coil, first and second terminals of the switch of the relay are respectively corresponding to the first and second terminals of the electrical switch, and a first terminal of the coil is corresponding to the control terminal of the electrical switch, a second terminal of the coil is grounded.

15. The electric injection molding machine of claim 9, wherein the DC link circuit includes two resistors connected in series and connected in parallel to the switch control circuit, a node between the two resistors is connected to the MCU to transmit a DC voltage at the node to the MCU.

16. The electric injection molding machine of claim 15, wherein the DC link circuit further includes a capacitor connected in parallel to the two resistors.

17. The electric injection molding machine of claim 9, wherein the heater is mounted on the delivery pipe.

\* \* \* \* \*